Feb. 1, 1938.                H. L. BERNARDE                2,106,825
                    ELECTRONIC REMOTE METERING SYSTEM
                           Filed Jan. 5, 1934

WITNESSES:
E. A. McCloskey.
F. J. Hicks

INVENTOR
Henry L. Bernarde.
BY
ATTORNEY

Patented Feb. 1, 1938

2,106,825

UNITED STATES PATENT OFFICE 2,106,825

ELECTRONIC REMOTE METERING SYSTEM

Henry L. Bernarde, Kearny, N. J., assignor to Westinghouse Electric & Manufacturing Company, East Pittsburgh, Pa., a corporation of Pennsylvania Application January 5, 1934, Serial No. 705,471

1 Claim. (Cl. 177—351)

My invention pertains to a remote metering system and more particularly to a system for actuating a plurality of spaced remotely disposed indicating instruments in accordance with a measured quantity. The systems previously provided for repeating the indications of measuring instruments at remotely spaced stations have commonly utilized contacts and Kelvin balance arrangements comprising many movable mechanical parts having considerable inertia which commonly caused sticking, and sluggish operation also overshooting and hunting, in addition to high maintenance expense.

It is accordingly an object of my invention to provide a simple remote metering system which will be quick and accurate in its operation.

It is also an object of my invention to provide a remote metering system which can be energized directly from the regular service mains, and which will not be affected by normal voltage fluctuations.

Another object of my invention is to provide a remote metering system energizable from the usual alternating current service mains to actuate remotely disposed direct current indicators in accordance with a measured quantity.

A further object of my invention is to provide an electronic remote metering system which will be practically free from errors caused by varying tube characteristics and line resistance.

It is also an object of my invention to provide a remote metering system which will not overshoot or hunt, and which will be practically instantaneous in its response.

Figure 1:
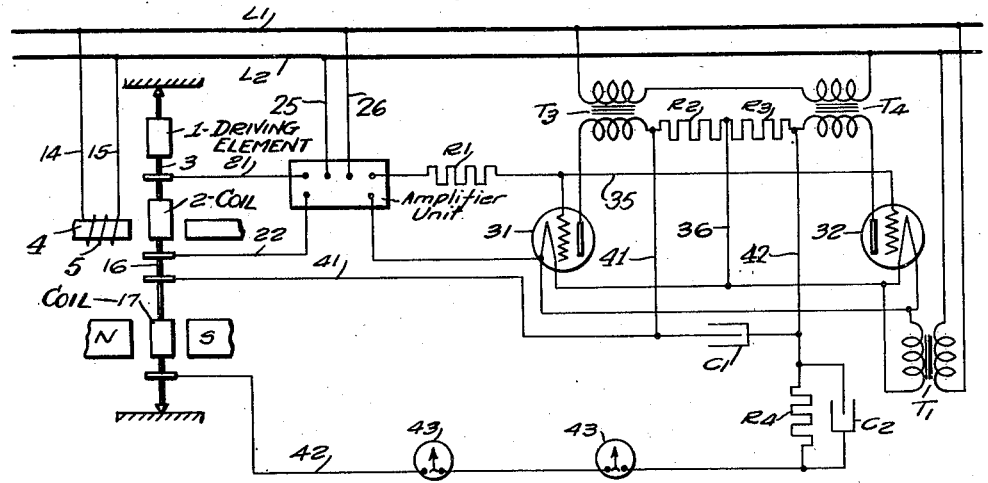
Figure 2:
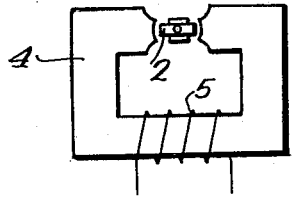

The invention itself, however, both as to its organization and its method of operation, together with additional objects and advantages thereof, will best be understood from the following description of specific embodiments, when read in conjunction with the accompanying drawing, in which:

Figure 1 is a diagrammatic view representing a remote metering system arranged in accordance with my invention; and Fig. 2 is a view showing a pick-up coil and the associated field structure.

Referring more specifically to Fig. 1 of the drawing, the apparatus comprises a basic driving element 1 which is the movable element of any measuring instrument or gauge responsive to the quantity to be measured whether it be volts, power factor, temperature, pressure, or some other quantity. A pick up coil 2 is rigidly connected with the primary measuring element 1 through a suitable mechanical connecting member such as a shaft 3. A field structure 4 which is positioned in closely coupled inductive relation with said pick up coil 2, is continuously energized by a winding 5 directly connected by suitable conductors 14 and 15 to an alternating current service line comprising conductors L1 L2.

The pick-up coil 2 is rigidly connected through a suitable shaft 16 to a restoring coil 17 comprising the movable member of an instrument such as a milliammeter of the D'Arsonval type. The pick-up coil 2 is connected in series relation to the input terminals of a suitable amplifier unit by conductors 21 and 22 which may be connected to the coils through slip rings, or flexible pigtail connectors, in a well known manner. The amplifier may be a conventional unit and it is energized through conductors 25 and 26 directly from the line-conductors L1 and L2.

A pair of three element electronic discharge tubes 31 and 32 are provided, which are preferably of the type known to the trade as #56. The filaments of the tubes are continuously energized from the main line conductors L1 and L2 through a suitable transformer T1.

The grids of both tubes are connected together through a suitable conductor 35, and they are simultaneously energized from the output terminals of the amplifier unit through a suitable resistor R1.

The plate circuit of the tube 31 extends through the secondary winding of a transformer T3, thence through a resistor R2 and by way of a conductor 36 to the filament circuit. The plate circuit of the other tube 32 extends through the secondary winding of another transformer T4, through a resistor R3, thence by way of the common connecting conductor 36 to the filament circuit. The primary windings of the two plate circuit transformers T3 and T4 are connected together to the main line conductors L1 and L2 for simultaneous energization therefrom, in such a manner that during a half cycle when the plate of either tube is positive the plate of the other tube is negative, and the transformer ratios are preferably selected to apply about 220 volts to the plates.

An output conductor 41 or 42 is connected between the resistor and the transformer winding in the plate circuit of each tube. The pair of output conductors 41 and 42 thus connected constitute a remote control circuit which may be extended to the various remote stations where devices 43 are to be controlled in accordance with the movements of the basic element 1. The controlled devices may be simple direct current milliammeters of the rugged D'Arsonval type and, as will be readily understood, the instruments must be provided with scales properly calibrated in terms of the quantity to be indicated. A resistor R4 is provided in series with the instruments 43 in the output circuit to suitably limit the current therein, and render the system substantially immune to errors caused by varying line resistance. A condenser C1 is preferably shunted across the output conductors 41 and 42, and an additional condenser C2 may also be connected in shunt with the series resistor R4, or it may be shunted around both the resistor R4 and one of the instruments 43.

The output circuit also includes the driving coil 17 of the milliammeter movement which is mechanically connected to the second pick-up coil 2. Very desirable operating characteristics were obtained in the system disclosed by selecting resistors R1, R2, R3 and R4 of 1 megohm; 16,500; 16,500; and 50,000 ohms; respectively and condensers C1 and C2 of one and one-half microfarads respectively. It will be apparent, however, that my invention is not in any way limited to the specific values of resistance, capacity, and voltage mentioned which are given merely by way of example. If the pole tips of the field structure adjacent the pick-up coil are so shaped that the flux is concentrated adjacent the coil, as indicated in Fig. 2, the sensitivity of the system is increased. It will be apparent that the amplifier unit may be omitted if the torque of the primary element 1 is high enough to actuate a large pick-up coil, but when the primary measuring element is a very sensitive and feeble device, it is important to provide a suitable amplifier.

The operation of my system will be considered assuming that the primary measuring element 1 is at a zero position. In this condition the pick-up coil 2 is at its corresponding zero position, as is also the associated restoring coil 17. The alternating voltage impressed upon the input terminals of the amplifier is then zero, as also is the voltage on the grids of the output tubes 31 and 32. The direct current impulses in the plate circuits of the output tubes are then equal, and since they pass through the resistors R2 and R3 in opposite directions, the IR drops are equal and opposite, and in any cycle the average voltage impressed upon the output circuit conductors 41 and 42 is zero. The indicating instruments are, therefore, all at their zero positions.

If the primary measuring element 1 moves to measure a finite value of any quantity, it will turn the connected pick-up coil 2 to a predetermined position in its associated field structure thereby applying a predetermined alternating voltage to the amplifier and thence to the grids of the output tubes 31 and 32. During each half-cycle when the grids become positive, the plate of one of the tubes is also charged positively. Assuming that the plate of the adjacent tube 31 is the one that is charged positively when the grids are positive, the average plate current of this tube will be increased. Conversely, the average plate current of the other tube 32 will be decreased since its grid becomes negative when its plate is positive.

With these conditions, the IR drops over the plate resistors R2 and R3 are no longer equal and opposite, and a voltage is impressed across the output conductors 41 and 42 which is equal to the average difference thereof. A current will then flow in the output circuit which causes the instruments 43 to deflect and the restoring coil 17 to develop a restoring force or torque.

Since the restoring force supplied by the restoring coil 17 diminishes as the zero position is approached, a position of equilibrium is attained wherein the restoring force exactly balances the force which is applied to the primary measuring element 1 by the quantity to be measured. Hence, for every value of the deflecting force applied by the metered quantity to the measuring element 1, the moving system comprising the rigidly interconnected elements 1, 2 and 17 assumes a predetermined position, and a corresponding current flows in the output circuit 41, 42, thereby deflecting the remotely spaced indicating instruments 43 to corresponding positions.

The indicating instruments 43 are moved very rapidly in response to the initial movement of the basic driving element 1, and the actuating force is gradually diminished as the instruments and the restoring coil 17 approach their final positions, thereby avoiding overshooting and hunting.

If the primary element 1 now moves in the reverse direction, the degree of unbalance of the tubes 31 and 32 will be diminished, the current in the output circuit will decrease, and the instruments will approach their zero position.

If the basic measuring element is one which measures in either direction from zero the instruments 43 may be provided with corresponding scales as the system will actuate them in either direction from zero in accordance with the movements of the basic element. The operation in the reverse direction is similar except that the output tubes 31 and 32 are unbalanced in the reverse relation and current flows in the opposite direction in the output circuit 41, 42.

Not only is my remote metering system very simple and free from mechanically moving parts and contacts, but it is very readily adjustable for various operating conditions and by properly selecting or adjusting the elements utilized in the circuits such as the resistors, condensers, transformers and tubes, or the amplifier sensitivity, or the turns on the pick-up coils, almost all possible degrees of sensitivity, damping, and other operating characteristics are readily obtainable. The system being inherently symmetrical, the response in either direction is equal. It will be readily understood that instead of using two separate three-element tubes 31 and 32, a single tube may be utilized which includes two anodes, a grid and a cathode in a single enclosure.

Instead of mechanically coupling the restoring device 17 directly to the primary or basic driving element 1, a second pick-up element, similar to that shown in Fig. 2, may be mechanically coupled to the restoring device 17 and electrically connected to the pick-up coil 2, so as to produce opposing electromotive forces rather than opposing torques. Such a construction is described and claimed in detail in my divisional application Serial No. 45,044, filed Oct. 15, 1935, and assigned to the Westinghouse Electric & Manufacturing Company.

It will be apparent that I have provided a simple remote metering system which eliminates complicated moving mechanical parts of high inertia, contacts, motors and variable resistances, and which has high speed response with good stability, and freedom from errors caused by normal variations in control voltage, tube characteristics, and line resistance.

Although I have shown and described certain specific embodiments of my invention, I am fully aware that many modifications thereof are possible. My invention, therefore, is not to be restricted except insofar as is necessitated by the prior art and the spirit of the appended claim.

I claim as my invention:

In combination, a plurality of remotely disposed direct current indicating instruments to be actuated in accordance with a variable quantity, a source of alternating current, a pair of electronic discharge devices each comprising a cathode, an anode and a control element, means for conductively interconnecting said cathodes and anodes, energizing means included in the individual anode circuits for energizing the respective anodes with opposite alternating potentials relative to their respective cathodes, impedance means included in each anode circuit between the individual energizing means and the common cathode connecting means, a line circuit for energizing the instruments comprising conductive means extending from the point in each anode circuit between the individual impedance means and the energizing means whereby the instruments are energized in accordance with the difference of the voltages across the impedances, a measuring device having an armature element responsive to said variable quantity, and translating means for applying an alternating voltage derived from said source to said control elements, said translating means including an element controlled by said armature element acting in a direction to increase the energization of said line circuit, and an element responsive to the current in said line circuit tending to reduce the current in said line circuit.

HENRY L. BERNARDE.